US009752485B2

(12) United States Patent
Eybergen et al.

(10) Patent No.: US 9,752,485 B2
(45) Date of Patent: Sep. 5, 2017

(54) EXHAUST GAS ENERGY RECOVERY SYSTEM

(71) Applicant: EATON CORPORATION, Cleveland, OH (US)

(72) Inventors: William Nicholas Eybergen, Harrison Township, MI (US); Swami Nathan Subramanian, Farmington Hills, MI (US)

(73) Assignee: EATON CORPORATION, Cleveland, OH (US)

( * ) Notice: Subject to any disclaimer, the term of this patent is extended or adjusted under 35 U.S.C. 154(b) by 154 days.

(21) Appl. No.: 14/790,578

(22) Filed: Jul. 2, 2015

(65) Prior Publication Data
US 2015/0300249 A1    Oct. 22, 2015

Related U.S. Application Data

(63) Continuation of application No. PCT/US2013/078037, filed on Dec. 27, 2013.
(Continued)

(51) Int. Cl.
*B60K 6/20* (2007.10)
*F01N 5/02* (2006.01)
(Continued)

(52) U.S. Cl.
CPC .............. *F01N 5/02* (2013.01); *F01N 5/04* (2013.01); *F02D 41/0007* (2013.01);
(Continued)

(58) Field of Classification Search
CPC .......... F01N 5/02; F01N 5/04; F02D 2250/34; F02D 41/0007; F05D 2220/32;
(Continued)

(56) References Cited

U.S. PATENT DOCUMENTS 2,266,820 A    12/1941 Smith
3,935,848 A    2/1976 Gamell
(Continued)

FOREIGN PATENT DOCUMENTS

KR    10-0897843 B1    5/2009
WO    WO 2013/130774 A1    9/2013

OTHER PUBLICATIONS

International Search Report for corresponding International Patent Application No. PCT/US2013/078037 dated Apr. 23, 2014.

*Primary Examiner* — Jesse Bogue
(74) *Attorney, Agent, or Firm* — Merchant & Gould P.C.

(57) ABSTRACT

An exhaust gas energy recovery system includes a power plant and a volumetric fluid expander. The power plant has an exhaust gas outlet for conveying an exhaust gas stream at a first pressure. The volumetric fluid expander includes a housing and an output shaft. The housing has an inlet and an outlet, and the housing inlet is in fluid communication with the exhaust gas outlet. The volumetric fluid expander generates useful work at the output shaft by expanding the exhaust gas stream to a second pressure lower than the first pressure generally without reducing the volume of the exhaust stream as the exhaust stream moves from the housing inlet to the outlet.

24 Claims, 11 Drawing Sheets

Related U.S. Application Data (60) Provisional application No. 61/748,740, filed on Jan. 3, 2013, provisional application No. 61/798,137, filed on Mar. 15, 2013, provisional application No. 61/787,834, filed on Mar. 15, 2013.

(51) Int. Cl.
  *F01N 5/04* (2006.01)
  *F02D 41/00* (2006.01)

(52) U.S. Cl.
  CPC ...... *F02D 2250/34* (2013.01); *F05D 2220/32* (2013.01); *F05D 2220/60* (2013.01); *F05D 2260/40311* (2013.01); *F05D 2260/42* (2013.01); *Y02T 10/16* (2013.01)

(58) Field of Classification Search
  CPC ....... F05D 2220/60; F05D 2260/40311; F05D 2260/42; Y02T 10/16
  See application file for complete search history.

(56) References Cited

U.S. PATENT DOCUMENTS

| | | |
|---|---|---|
| 4,932,211 A | 6/1990 | Buthmann et al. |
| 6,516,603 B1 | 2/2003 | Urbach et al. |
| 7,644,585 B2 | 1/2010 | Haugen et al. |
| 8,196,686 B2 | 6/2012 | Grieve |
| 2005/0198957 A1* | 9/2005 | Kim .................... F02B 29/0437 60/612 |
| 2009/0188253 A1* | 7/2009 | Smith ...................... F01C 1/16 60/657 |
| 2011/0017170 A1 | 1/2011 | Song et al. |
| 2011/0036089 A1 | 2/2011 | Triller et al. |
| 2011/0247326 A1 | 10/2011 | Imani |
| 2012/0263617 A1 | 10/2012 | Tinney |
| 2014/0050560 A1* | 2/2014 | Schuster ................ F01K 25/10 415/1 |
| 2015/0007569 A1* | 1/2015 | Eybergen ................. F01K 7/36 60/670 |
| 2015/0252719 A1* | 9/2015 | Pryor .................... F04C 18/16 92/177 |
| 2016/0290172 A1* | 10/2016 | Aumann ................ F01K 25/06 |

* cited by examiner

FIG. 11

EXHAUST GAS ENERGY RECOVERY SYSTEM

RELATED APPLICATIONS

This application is Continuation of PCT/US2013/078037, filed 27 Dec. 2013, which claims benefit of U.S. Patent Application Ser. No. 61/748,740, filed 3 Jan. 2013, U.S. Patent Application Ser. No. 61/798,137, filed 15 Mar. 2013 and U.S. Patent Application Ser. No. 61/787,834, filed 15 Mar. 2013 and which applications are incorporated herein by reference. To the extent appropriate, a claim of priority is made to each of the above disclosed applications.

TECHNICAL FIELD

The present disclosure relates to a volumetric fluid expander used for an exhaust gases recirculation system.

BACKGROUND

Waste heat energy is necessarily produced in many processes that generate energy or convert energy into useful work, such as a power plant. Typically, such waste heat energy is released into the ambient environment. In one application, waste heat energy is generated from an internal combustion engine. Exhaust gases from the engine have a high temperature and pressure and are typically discharged into the ambient environment without any energy recovery process. Alternatively, some approaches have been introduced to recover waste energy and re-use the recovered energy in the same process or in separate processes. However, there is still demand for enhancing the efficiency of energy recovery.

SUMMARY

In general terms, this disclosure is directed to a volumetric fluid expander. Various aspects are described in this disclosure, which include, but are not limited to, the following aspects.

In one aspect of the disclosure, a volumetric fluid expander is provided to generate useful work by expanding a working fluid. In one application, the volumetric fluid expander can be utilized to recover waste energy from a power plant, such as waste heat energy from a fuel cell or an internal combustion engine. The power plant may be provided in a vehicle or may be provided in a stationary application such as could be the case when the power plant is used as a generator. In one possible configuration and by non-limiting example, the volumetric fluid expander is employed in an exhaust gas recirculation system of an internal combustion engine.

In one example, the working fluid is all or part of the exhaust gas stream from an internal combustion engine or a fuel cell. In another example, the working fluid is separate from and heated by a waste heat stream from an internal combustion engine or a fuel cell, such as is disclosed in Patent Cooperation Treaty International Publication Number WO 2013/130774. WO 2013/130774 discloses that the working fluid can be used in a Rankine cycle where the working fluid may be a solvent such as ethanol, n-pentane, or toluene. The entirety of WO 2013/120774 is hereby incorporated by reference herein.

As shown, the volumetric fluid expander includes a housing having an inlet port configured to admit the working fluid at a first pressure and an outlet port configured to discharge the working fluid at a second pressure lower than the first pressure. The expander also includes first and second twisted meshed rotors rotatably disposed in the housing that are configured to be rotated by the working fluid and to transfer the working fluid from the inlet to the outlet. Each rotor is provided with a plurality of lobes oriented such that when one lobe of the first rotor is leading with respect to the inlet port, one lobe of the second rotor is trailing with respect to the inlet port. The expander additionally includes an output shaft that is rotated by movement of the rotors such that energy recovered by the volumetric fluid expander can be transferred back to the power plant.

Yet another embodiment of the disclosure is directed to a vehicle including a power-plant and employing the above system to augment the power generated by the power-plant.

In another aspect of the disclosure, an energy recovery device is provided in an exhaust gas recirculation (EGR) system to enhance the performance or efficiency of an internal combustion engine. The volumetric fluid expander is configured to receive a first exhaust stream from the engine, expand the first exhaust stream to a second exhaust stream, generate a mechanical work, and discharge the second exhaust stream. The volumetric fluid expander as described above may be used for the volumetric fluid expander. The second exhaust stream has a lower pressure and/or temperature than the first exhaust stream. In particular, the volumetric fluid expander includes a housing having an inlet port and an outlet port. Where the engine has an intake manifold and an exhaust manifold, the inlet port is in fluid communication with the exhaust manifold and configured to receive the first exhaust stream from the exhaust manifold. The outlet port is in fluid communication with the intake manifold and configured to discharge the second exhaust stream. In some embodiments, the inlet port may be directly in fluid communication with the exhaust manifold, and the outlet port may be directly in fluid communication with the intake manifold.

The energy recovery system may further include a generator connected to the volumetric fluid expander. In some embodiments, the generator is configured to control a rotational speed of the rotors in the volumetric fluid expander, thereby adjusting an amount of the second exhaust stream discharged from the device.

The energy recovery system may further include an energy storage device. A mechanical work generated by the volumetric fluid expander is accumulated in the energy storage device for subsequent release on demand. The energy storage device may be a battery or an accumulator.

In yet another aspect of the disclosure, a generator for a volumetric fluid expander is provided. The generator is configured to control a rotational speed of the rotors to adjust an amount of the second exhaust stream discharged from the housing of the volumetric fluid expander.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Volumetric Fluid Expander

Referring now to FIGS. 1-4, two embodiments (FIGS. 1-2 and FIGS. 3-4) of a volumetric fluid expander 20 are shown. It is noted that the same reference numbers are utilized for both embodiments where the features are generally similar. The following description is fully applicable for each embodiment. The volumetric fluid expander 20 may also be referred to herein as an expander, expansion device or volumetric energy recovery device. An energy recovery system can be formed by coupling components with the output of the volumetric fluid expander that transfers energy back to the power plant directly or indirectly.

As shown, expansion device 20 has a housing 22 with a fluid inlet 24 and a fluid outlet 26 through which the fluid 12-1 undergoes a pressure drop to transfer energy to the output shaft 38. The inlet port 24 is configured to admit the working fluid 12-1 at a first pressure whereas the outlet port 26 is configured to discharge the working fluid 12-2 at a second pressure lower than the first pressure. The output shaft 38 is driven by synchronously connected first and second interleaved counter-rotating rotors 30, 32 which are disposed in a cavity 28 of the housing 22. Each of the rotors 30, 32 has lobes that are twisted or helically disposed along the length of the rotors 30, 32. Upon rotation of the rotors 30, 32, the lobes at least partially seal the fluid 12-1 against an interior side of the housing at which point expansion of the fluid 12-1 only occurs to the extent allowed by leakage which represents and inefficiency in the system. In contrast to some expansion devices that change the volume of the fluid when the fluid is sealed, the volume defined between the lobes and the interior side of the housing 22 of device 20 is constant as the fluid 12-1 traverses the length of the rotors 30, 32. Accordingly, the expansion device 20 is referred to as a "volumetric device" as the sealed or partially sealed fluid volume does not change.

Figure 2:
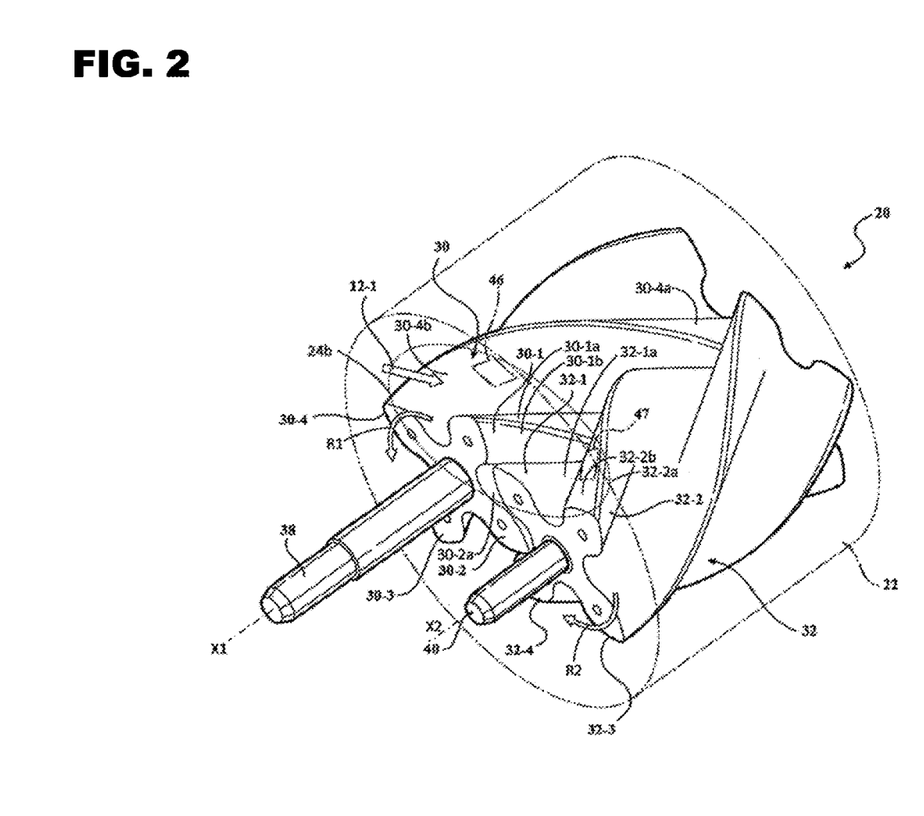
FIG. 2 is a schematic perspective top view of the volumetric fluid expander shown in FIG. 1.
Figure 3:
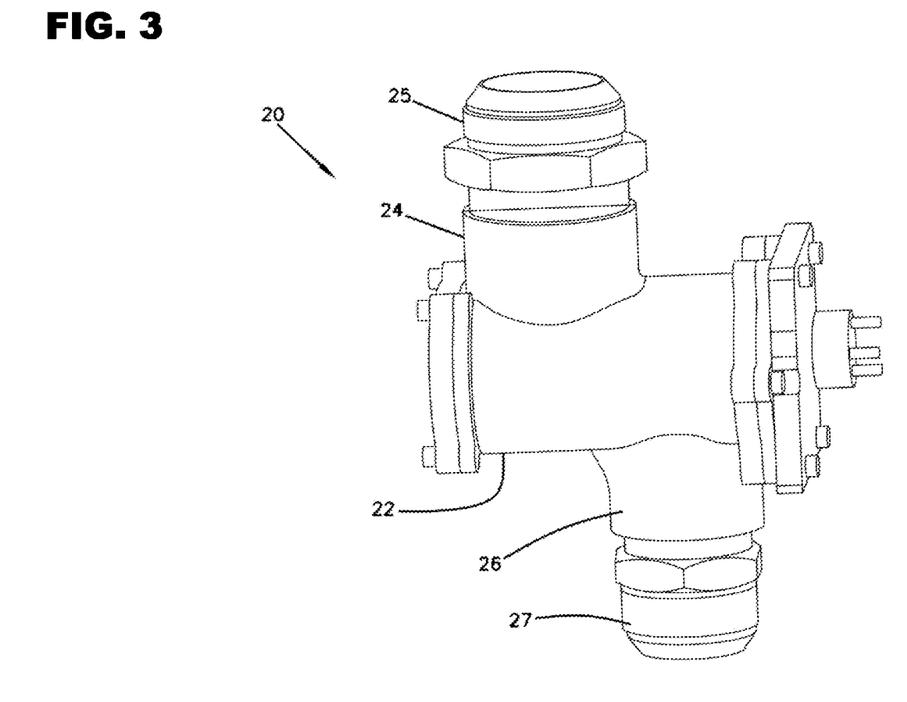
FIG. 3 is a side perspective view of a second embodiment of a volumetric fluid expander having features that are examples of aspects in accordance with the principles of the present disclosure.
Figure 7:
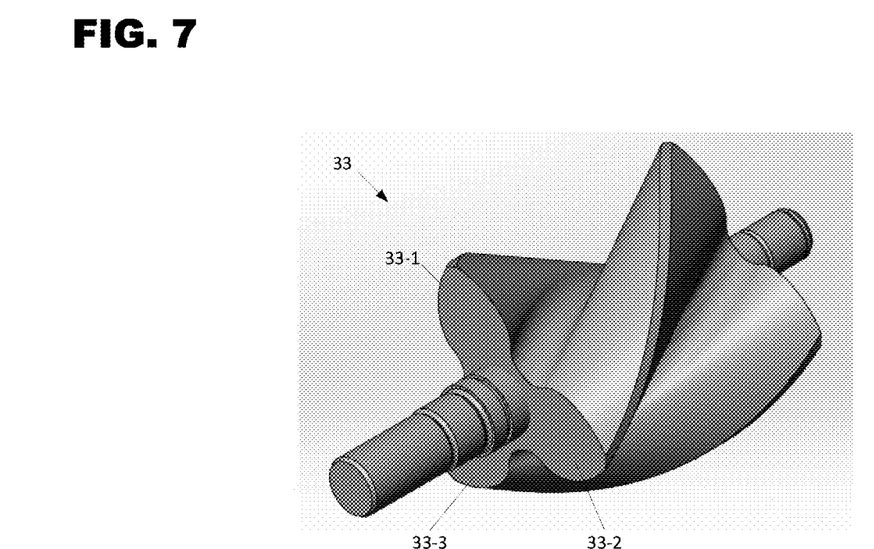
FIG. 7 is a perspective view of a rotor usable in the volumetric fluid expanders shown in FIGS. 1 and 3.

As additionally shown in FIG. 2, each rotor 30, 32 has four lobes, 30-1, 30-2, 30-3, and 30-4 in the case of the rotor 30, and 32-1, 32-2, 32-3, and 32-4 in the case of the rotor 32. Although four lobes are shown for each rotor 30 and 32, each of the two rotors may have any number of lobes that is equal to or greater than two. For example, FIG. 7 shows a suitable rotor 33 having three lobes 33-1, 33-2, and 33-3. Additionally, the number of lobes is the same for each rotor 30 and 32. This is in contrast to the construction of typical rotary screw devices and other similarly configured rotating equipment which have a dissimilar number of lobes (e.g. a male rotor with "n" lobes and a female rotor with "n+1" lobes). Furthermore, one of the distinguishing features of the expansion device 20 is that the rotors 30 and 32 are identical, wherein the rotors 30, 32 are oppositely arranged so that, as viewed from one axial end, the lobes of one rotor are twisted clockwise while the lobes of the meshing rotor are twisted counter-clockwise. Accordingly, when one lobe of the rotor 30, such as the lobe 30-1 is leading with respect to the inlet port 24, a lobe of the rotor 32, such as the lobe 30-2, is trailing with respect to the inlet port 24, and, therefore with respect to a stream of the high-pressure fluid 12-1.

As shown, the first and second rotors 30 and 32 are fixed to respective rotor shafts, the first rotor being fixed to an output shaft 38 and the second rotor being fixed to a shaft 40. Each of the rotor shafts 38, 40 is mounted for rotation on a set of bearings (not shown) about an axis X1, X2, respectively. It is noted that axes X1 and X2 are generally parallel to each other.

The first and second rotors 30 and 32 are interleaved and continuously meshed for unitary rotation with each other. With renewed reference to FIG. 1, the expander 20 also includes meshed timing gears 42 and 44, wherein the timing gear 42 is fixed for rotation with the rotor 30, while the timing gear 44 is fixed for rotation with the rotor 32. The timing gears 42, 44 are also configured to maintain the relative position of the rotors 30, 32 such that contact between the rotors is entirely prevented between the rotors 30, 32 which could cause extensive damage to the rotors 30, 32. Rather, a close tolerance between the rotors 30, 32 is maintained during rotation by the timing gears 42, 44. As the rotors 30, 32 are non-contacting, a lubricant in the fluid 12 is not required for operation of the expansion device 20, in contrast to typical rotary screw devices and other similarly configured rotating equipment having rotor lobes that contact each other.

The output shaft 38 is rotated by the working fluid 12 as the fluid undergoes expansion from the higher first pressure working fluid 12-1 to the lower second pressure working fluid 12-2. As may additionally be seen in both FIGS. 1 and 2, the output shaft 38 extends beyond the boundary of the housing 22. Accordingly, the output shaft 38 is configured to capture the work or power generated by the expander 20 during the expansion of the fluid 12 that takes place in the rotor cavity 28 between the inlet port 24 and the outlet port 26 and transfer such work as output torque from the expander 20. Although the output shaft 38 is shown as being operatively connected to the first rotor 30, in the alternative the output shaft 38 may be operatively connected to the second rotor 32. The output shaft 38 can be coupled to the engine 52 such that the energy from the exhaust can be recaptured.

Figure 5:
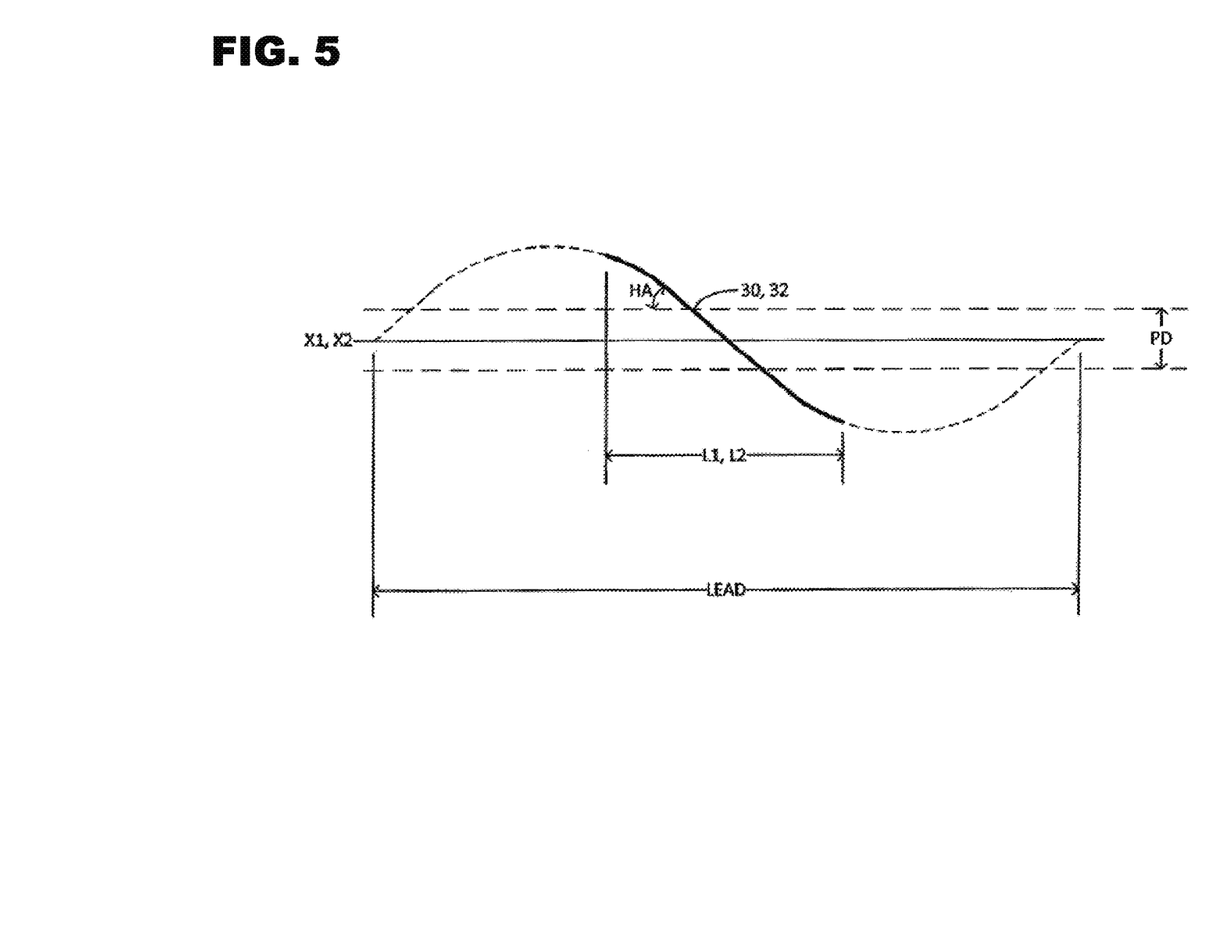
FIG. 5 is a schematic showing geometric parameters of the rotors of the volumetric fluid expanders shown in FIGS. 1 and 3.
Figure 6:
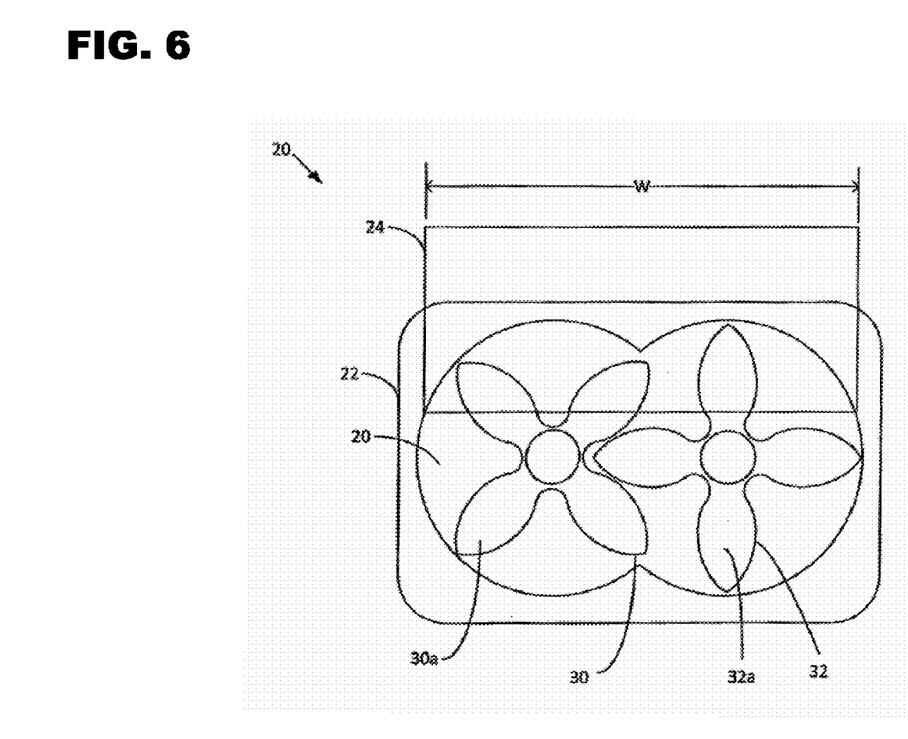
FIG. 6 is a schematic showing the rotors of the volumetric fluid expanders shown in FIGS. 1 and 3.

In one aspect of the geometry of the expander 20, each of the rotor lobes 30-1 to 30-4 and 32-1 to 32-4 has a lobe geometry in which the twist of each of the first and second rotors 30 and 32 is constant along their substantially matching length 34. As shown schematically at FIG. 5, one parameter of the lobe geometry is the helix angle HA. By way of definition, it should be understood that references hereinafter to "helix angle" of the rotor lobes is meant to refer to the helix angle at the pitch diameter PD (or pitch circle) of the rotors 30 and 32. The term pitch diameter and its identification are well understood to those skilled in the gear and rotor art and will not be further discussed herein. As used herein, the helix angle HA can be calculated as follows: Helix Angle (HA)=(180/.pi.*arctan (PD/Lead)), wherein: PD=pitch diameter of the rotor lobes; and Lead=the lobe length required for the lobe to complete 360 degrees of twist. It is noted that the Lead is a function of the twist angle and the length L1, L2 of the lobes 30, 32, respectively. The twist angle is known to those skilled in the art to be the angular displacement of the lobe, in degrees, which occurs in "traveling" the length of the lobe from the rearward end of the rotor to the forward end of the rotor. As shown, the twist angle is about 120 degrees, although the twist angle may be fewer or more degrees, such as 160 degrees.

Figure 1:
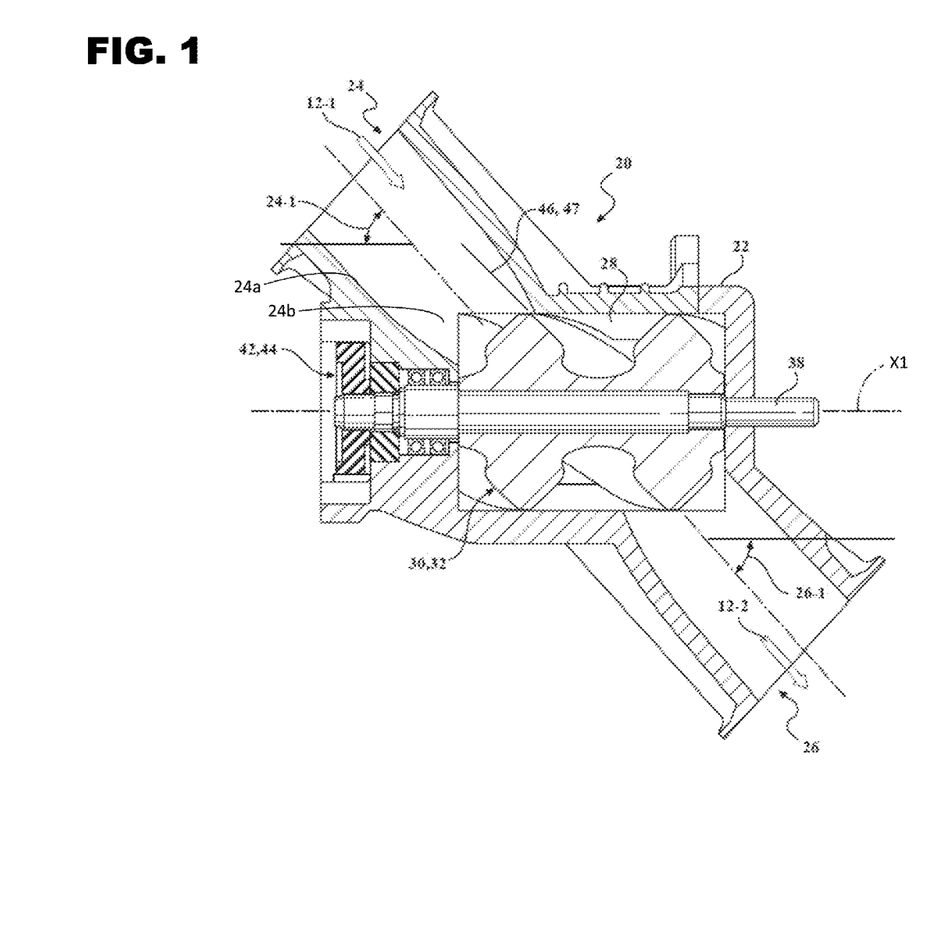
FIG. 1 is a cross-sectional side view of a first embodiment of a volumetric fluid expander having features that are examples of aspects in accordance with the principles of the present disclosure.
Figure 4:
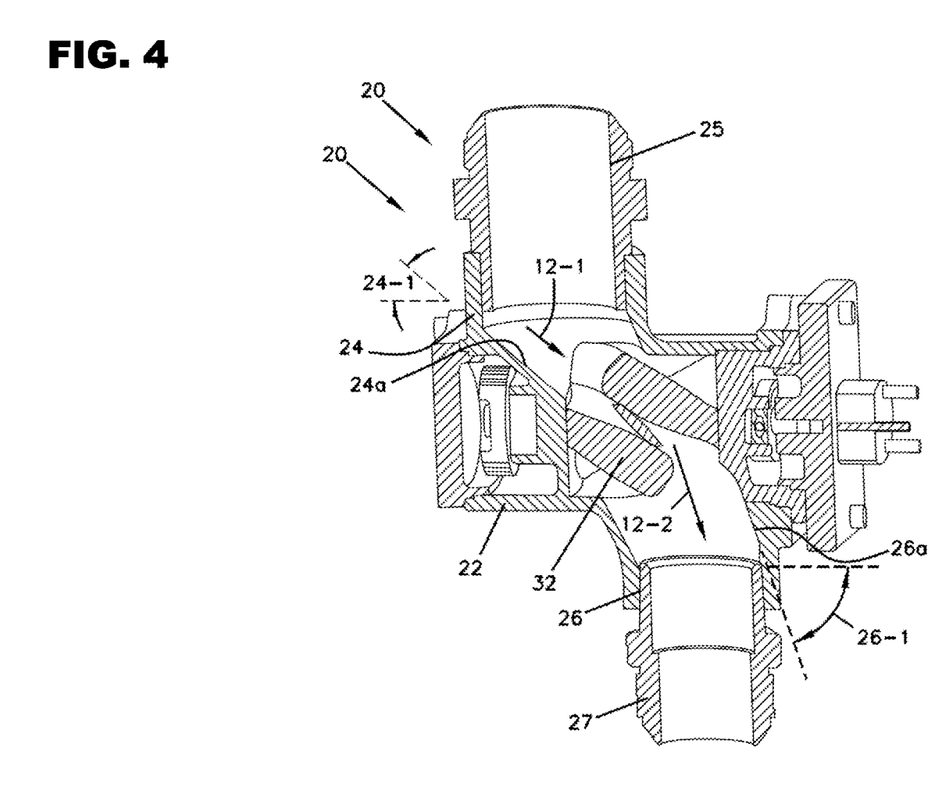
FIG. 4 is a cross-sectional side perspective view of the volumetric fluid expander shown in FIG. 3.

In another aspect of the expander geometry, the inlet port 24 includes an inlet angle 24-1, as can be seen schematically at FIG. 4. In one example, the inlet angle 24-1 is defined as the general or average angle of an inner surface 24a of the inlet port 24, for example an anterior inner surface. In one example, the inlet angle 24-1 is defined as the angle of the general centerline of the inlet port 24, for example as shown at FIGS. 1 and 4. In one example, the inlet angle 24-1 is defined as the general resulting direction of the fluid 12-1 entering the rotors 30, 32 due to contact with the anterior inner surface 24a, as can be seen at FIGS. 1 and 4. As shown, the inlet angle 24-1 is neither perpendicular nor parallel to the rotational axes X1, X2 of the rotors 30, 32. Accordingly, the anterior inner surface 24a of the inlet port 24 causes a substantial portion of the fluid 12-1 to be shaped in a direction that is at an oblique angle with respect to the rotational axes X1, X2 of the rotors 30, 32, and thus generally parallel to the inlet angle 24-1.

Furthermore, and as shown in FIGS. 1 and 4, the inlet port 24 may be shaped such that the fluid 12-1 is directed to the first axial ends 30a, 30b of the rotors 30, 32 and directed to the rotor lobe leading and trailing surfaces (discussed below) from a lateral direction. However, it is to be understood that the inlet angle 24-1 may be generally parallel or generally perpendicular to axes X1, X2, although an efficiency loss may be anticipated for certain rotor configurations. Furthermore, it is noted that the inlet port 24 may be shaped to narrow towards the inlet opening 24b, as shown in FIGS. 1 and 4.

In another aspect of the expander geometry, the outlet port 26 includes an outlet angle 26-1, as can be seen schematically at FIGS. 1 and 4. In one example, the outlet angle 26-1 is defined as the general or average angle of an inner surface 26a of the outlet port 26. In one example, the outlet angle 26-1 is defined as the angle of the general centerline of the outlet port 26, for example as shown at FIGS. 1 and 4. In one example, the outlet angle 26-1 is defined as the general resulting direction of the fluid 12-2 leaving the rotors 30, 32 due to contact with the inner surface 26a, as can be seen at FIGS. 1 and 4. As shown, the outlet angle 26-1 is neither perpendicular nor parallel to the rotational axes X1, X2 of the rotors 30, 32. Accordingly, the inner surface 26a of the outlet port 26 receives the leaving fluid 12-2 from the rotors 30, 32 at an oblique angle which can reduce backpressure at the outlet port 26. In one example, the inlet angle 24-1 and the outlet angle 26-1 are generally equal or parallel, as shown in FIGS. 1 and 4. In one example, the inlet angle 24-1 and the outlet angle 26-1 are oblique with respect to each other. It is to be understood that the outlet angle 26-1 may be generally perpendicular to axes X1, X2, although an efficiency loss may be anticipated for certain rotor configurations. It is further noted that the outlet angle 26-1 may be perpendicular to the axes X1, X2. As configured, the orientation and size of the outlet port 26-1 are established such that the leaving fluid 12-2 can evacuate each rotor cavity 28 as easily and rapidly as possible so that backpressure is reduced as much as possible. The output power of the shaft 38 is maximized to the extent that backpressure caused by the outlet can be minimized such that the fluid can be rapidly discharged.

The efficiency of the expander 20 can be optimized by coordinating the geometry of the inlet angle 24-1 and the geometry of the rotors 30, 32. For example, the helix angle HA of the rotors 30, 32 and the inlet angle 24-1 can be configured together in a complementary fashion. Because the inlet port 24 introduces the fluid 12-1 to both the leading and trailing faces of each rotor 30, 32, the fluid 12-1 performs both positive and negative work on the expander 20.

To illustrate, FIG. 2 shows that lobes 30-1, 30-4, 32-1, and 32-2 are each exposed to the fluid 12-1 through the inlet port opening 24b. Each of the lobes has a leading surface and a trailing surface, both of which are exposed to the fluid at various points of rotation of the associated rotor. The leading surface is the side of the lobe that is forward most as the rotor is rotating in a direction R1, R2 while the trailing surface is the side of the lobe opposite the leading surface. For example, rotor 30 rotates in direction R1 thereby resulting in side 30-1a as being the leading surface of lobe 30-1 and side 30-1b being the trailing surface. As rotor 32 rotates in a direction R2 which is opposite direction R1, the leading and trailing surfaces are mirrored such that side 32-2a is the leading surface of lobe 32-2 while side 32-2b is the trailing surface.

In generalized terms, the fluid 12-1 impinges on the trailing surfaces of the lobes as they pass through the inlet port opening 24b and positive work is performed on each rotor 30, 32. By use of the term positive work, it is meant that the fluid 12-1 causes the rotors to rotate in the desired direction: direction R1 for rotor 30 and direction R2 for rotor 32. As shown, fluid 12-1 will operate to impart positive work on the trailing surface 32-2b of rotor 32-2, for example on surface portion 47. The fluid 12-1 is also imparting positive work on the trailing surface 30-4b of rotor 30-1, for example of surface portion 46. However, the fluid 12-1 also impinges on the leading surfaces of the lobes, for example surfaces 30-1 and 32-1, as they pass through the inlet port opening 24b thereby causing negative work to be performed on each rotor 30, 32. By use of the term negative work, it is meant that the fluid 12-1 causes the rotors to rotate opposite to the desired direction, R1, R2.

Accordingly, it is desirable to shape and orient the rotors 30, 32 and to shape and orient the inlet port 24 such that as much of the fluid 12-1 as possible impinges on the trailing surfaces of the lobes with as little of the fluid 12-1 impinging on the on the leading lobes such that the highest net positive work can be performed by the expander 20.

One advantageous configuration for optimizing the efficiency and net positive work of the expander 20 is a rotor lobe helix angle HA of about 35 degrees and an inlet angle 24-1 of about 30 degrees. Such a configuration operates to maximize the impingement area of the trailing surfaces on the lobes while minimizing the impingement area of the leading surfaces of the lobes. In one example, the helix angle is between about 25 degrees and about 40 degrees. In one example, the inlet angle 24-1 is set to be within (plus or minus) 15 degrees of the helix angle. In one example, the helix angle is between about 25 degrees and about 40 degrees. In one example, the inlet angle 24-1 is set to be within (plus or minus) 15 degrees of the helix angle HA. In one example, the inlet angle is within (plus or minus) 10 degrees of the helix angle. In one example, the inlet angle 24-1 is set to be within (plus or minus) 5 degrees of the helix angle HA. In one example, the inlet angle 24-1 is set to be within (plus or minus) fifteen percent of the helix angle HA while in one example, the inlet angle 24-1 is within ten percent of the helix angle. Other inlet angle and helix angle values are possible without departing from the concepts presented herein. However, it has been found that where the values for the inlet angle and the helix angle are not sufficiently close, a significant drop in efficiency (e.g. 10-15% drop) can occur.

Exhaust Gas Energy Recovery System with Volumetric Fluid Expander

Figure 8:
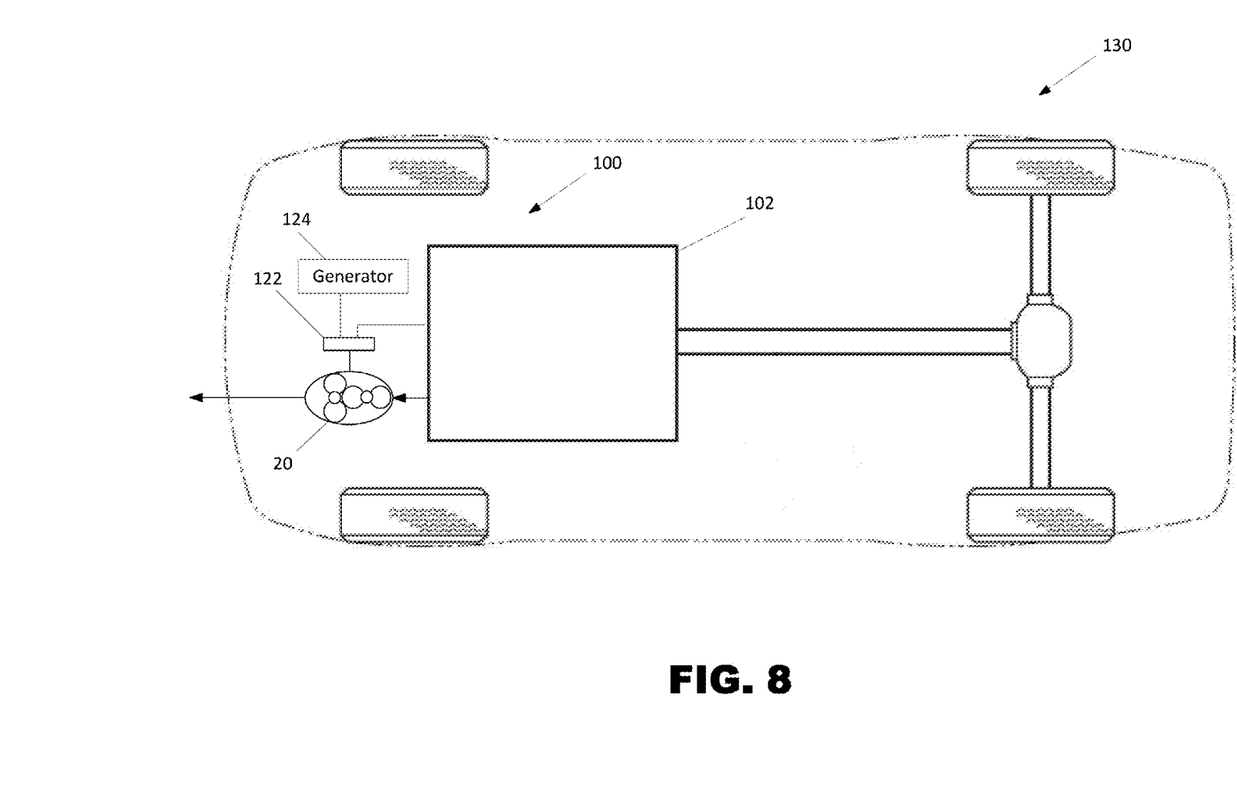
FIG. 8 is a schematic view of a first embodiment of an energy recovery system with a volumetric fluid expander, which is implemented in a vehicle.

FIG. 8 is a schematic view of a first embodiment of an energy recovery system 100 with a volumetric fluid expander 20. As shown in FIG. 8, the energy recovery system may be implemented in a vehicle 130. The volumetric fluid expander 20 operates directly with exhaust gases from a power plant 102, such as a fuel cell or an internal combustion engine. The volumetric fluid expander 20 is configured to receive a portion or all of the exhaust gases from the power plant 102, and extract at least some of the energy stored in the exhaust gas flow. In some embodiments, the recovered energy is fed back to the power plant 102. For example, a drive shaft of the power plant 102 is mechanically coupled to the output shaft of the volumetric fluid expander 20 so that the recovered energy by the volumetric fluid expander 20 is transferred to the power plant 102. In other embodiments, the recuperated energy is delivered to an electrical generator 124, or used to power other components or be stored for future use in an energy storage device, such as an accumulator. In still other embodiments, the recovered energy may be delivered to both the power plant 102 and the electrical generator 124, as shown in FIG. 8.

The volumetric fluid expander 20 may have a power transmission link 122 employed either between the volumetric fluid expander 20 and the power plant 102 and/or between the volumetric fluid expander 20 and the generator 124, to provide a better match between rotational speeds of the output shaft of the device 20 and the power plant 102 or the generator 124. The power transmission link 122 may be a gear unit, a hydraulic motor, a belt pulley, or any other device capable of transferring energy in a mechanical fashion. Where the volumetric fluid expander 20 is coupled both to the power plant 102 and the generator 124, the power transmission link 122 may be configured as a variable speed drive system that connects the output shaft of the volumetric fluid expander both to the output shaft of the power plant 102 and to the generator 124. In some embodiments, the variable speed drive system is a planetary gear that includes a sun gear, a ring gear, and a plurality of planet gears between the sun and the ring gears. The sun gear may be coupled to the output shaft of the volumetric fluid expander 20, the planet gears may be coupled to the output shaft of the power plant 102, and the ring gear may be coupled to the generator 124.

Figure 9:
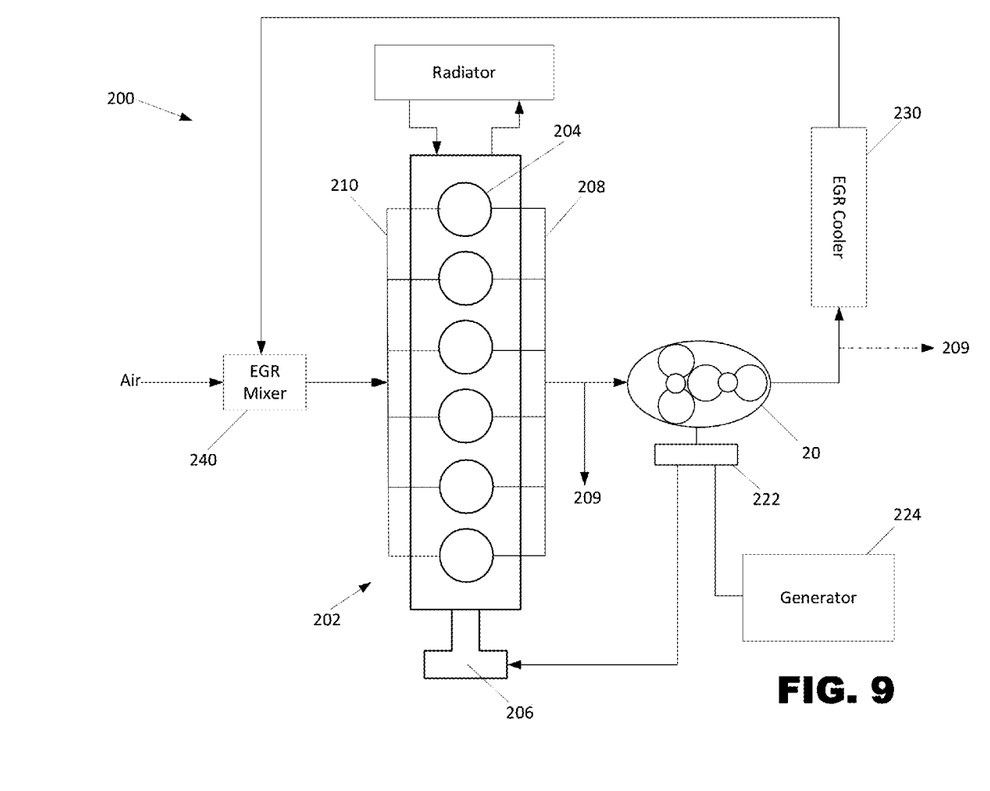
FIG. 9 is a schematic diagram of a second embodiment of the energy recovery system with the volumetric fluid expander.

FIG. 9 is a schematic diagram of a second embodiment of the energy recovery system 200 with the volumetric fluid expander 20. The exhaust gas energy recovery system 200 recirculates exhaust gases from an engine 202 back to the intake of the engine 202. The system 200 employs the volumetric fluid expander 20 for recovering at least a portion of the energy from the exhaust gases and controlling the amount of exhaust gas recirculation fed back to the engine 202. In this example, the system 200 includes the engine 202, the volumetric fluid expander 20, and an EGR cooler 230.

The engine 202 is configured to operate with a portion of exhaust gases recirculated into the engine 202 in the system 200. Typically, the engine 202 includes a plurality of cylinders 204, a crankshaft 206, an exhaust manifold 208, and an intake manifold 210. The plurality of cylinders 204 accommodate pistons (not shown) and allow the pistons to reciprocate therein. The crankshaft 206 is configured to translate linear motions of the reciprocating pistons into rotation. The exhaust manifold 208 may be configured as a unitary structure that is in fluid communication with the plurality of cylinders 204 and collects the exhaust gases from the cylinders 204. In this example, the exhaust manifold 208 is directly connected to the volumetric fluid expander 20 and in fluid communication with the device 20. The intake manifold 210 is in fluid communication with the plurality of cylinders 204 and configured to supply the fuel/air mixture to the cylinders 204.

The volumetric fluid expander 20 can be configured not only to recover energy from exhaust gases but to control the amount of the exhaust gases fed back to the engine 202 in the system 200. The exhaust gases discharged from the cylinders 204 through the exhaust manifold 208 have a higher pressure higher than ambient pressure, and, thus, contain energy that can be recovered by the volumetric fluid expander 20. To recuperate energy from the exhaust gases, the volumetric fluid expander 20 is configured to receive the exhaust gases from the engine 202, expand the exhaust gases so that the exhaust gases have lower pressure when they are discharged from the device 20. This also results in significant cooling of the exhaust gases. The volumetric fluid expander 20 recuperates energy from the exhaust gases as the exhaust gases expand within the device 20, and generates a mechanical work out of the recovered energy.

In this example, the volumetric fluid expander 20 is directly in fluid communication with the exhaust manifold 208 of the engine 202 to receive the exhaust gases from the engine 202. In some embodiments, the volumetric fluid expander 20 is configured in a manner similar to the volumetric fluid expander 20 as described in this document. For example, the volumetric fluid expander 20 includes a housing, a plurality of rotors, and an output shaft.

The housing has inlet and outlet ports. The inlet port is in fluid communication with the exhaust manifold to receive the exhaust gases from the cylinders 204. The outlet port is in fluid communication with the intake manifold and discharges the exhaust gases that have been expanded within the device 20.

The plurality of rotors is arranged within the housing and operates to expand the exhaust gases. As shown above with reference to FIGS. 2 and 3, the plurality of rotors may include two twisted meshed rotors. The two rotors are rotatably disposed within the housing and have a plurality of lobes, respectively.

The output shaft is connected to one of the rotors and operates to be rotated by the exhaust gases as the exhaust gases pass through the rotors and expand in volume. Such a mechanical work generated by the rotation of the output shaft may be delivered to any elements or devices as necessary. For example, the recuperated energy may be accumulated in an energy storage device, such as a battery or an accumulator, and the energy storage device may release the stored energy on demand. In other examples, the recovered energy may return to the engine 202 by mechanically coupling the output shaft of the device 20 to the crankshaft 206 of the engine 202, as shown in FIG. 9. A power transmission link 222 may be employed between the volumetric fluid expander 20 and the engine 202 to provide a better match between rotational speeds of the engine 202 and the output shaft of the device 20. In some embodiments, the power transmission link 222 can be configured as a planetary gear set to provide two outputs for the engine 202 and a generator 224, as shown in FIG. 9.

The volumetric fluid expander 20 also operates to control the amount of exhaust gases fed back into the engine 202 through the intake manifold 210, and, therefore, replaces an EGR valve that is typically used to regulate the amount of exhaust gases recirculated to the engine 202 in the system 200. To replace an EGR valve, the volumetric fluid expander 20 is arranged to be in fluid communication with the intake manifold 210 as well as the exhaust manifold 208. For example, while the inlet port of the volumetric fluid expander 20 is directly in fluid communication with the exhaust manifold 208 as illustrated above, the outlet port of the device 20 is configured to be in fluid communication with the intake manifold 210 so that the exhaust gases expanded within the device 20 is discharged to the intake manifold 210. In some embodiments, the outlet port of the volumetric fluid expander 20 is directly in fluid communication with the intake manifold 210 of the engine 202.

The system 200 may further include an outlet 209 either before the volumetric fluid expander 209 or after the volumetric fluid expander 209. Because all of the exhaust gases from the engine 202 are not necessarily fed back into the intake manifold 210, the outlet 209 operates to discharge an unnecessary portion of the exhaust gases out the system 200 and prevent it from being fed into the engine 202.

The system 200 may also include the generator 224 for controlling the amount of the exhaust gases recirculated back into the engine 202. The generator 224 may be mechanically coupled to the output shaft of the volumetric fluid expander 20 and operates to determine and control the speed of the rotors in the device 20. By adjusting the rotational speed of the rotors, the generator 224 can control the amount or volume of the exhaust gases that expand within the device 20 and are discharged from the device 20 to be fed back into the engine 202 through the intake manifold 210.

The volumetric fluid expander 20 also operates to reduce an EGR cooling load. Typically, the system 200 requires the EGR cooler 230 to reduce a temperature of the exhaust gases that is recirculated back into the engine 202. However, the volumetric fluid expander 20 that is arranged in the line of the EGR circuit operates to provide the exhaust gases with a decreased temperature, and thus reduces a cooling load for the EGR cooler 230. As explained above, the exhaust gases from the exhaust manifold 208 undergoes expansion in volume (that is, decrease in pressure) as the exhaust gases pass through the rotors within the volumetric fluid expander 20. At the same time, such volumetric expansion causes decrease in temperature of the exhaust gases. As such, the volumetric fluid expander 20 reduces the temperature of the exhaust gases and shares the EGR cooling load with the EGR cooler 230. In some embodiments in which the volumetric fluid expander 20 operates sufficiently to reduce a temperature of the recirculated exhaust gases as required, the EGR cooler 230 is not required in the system 200.

Figure 10:
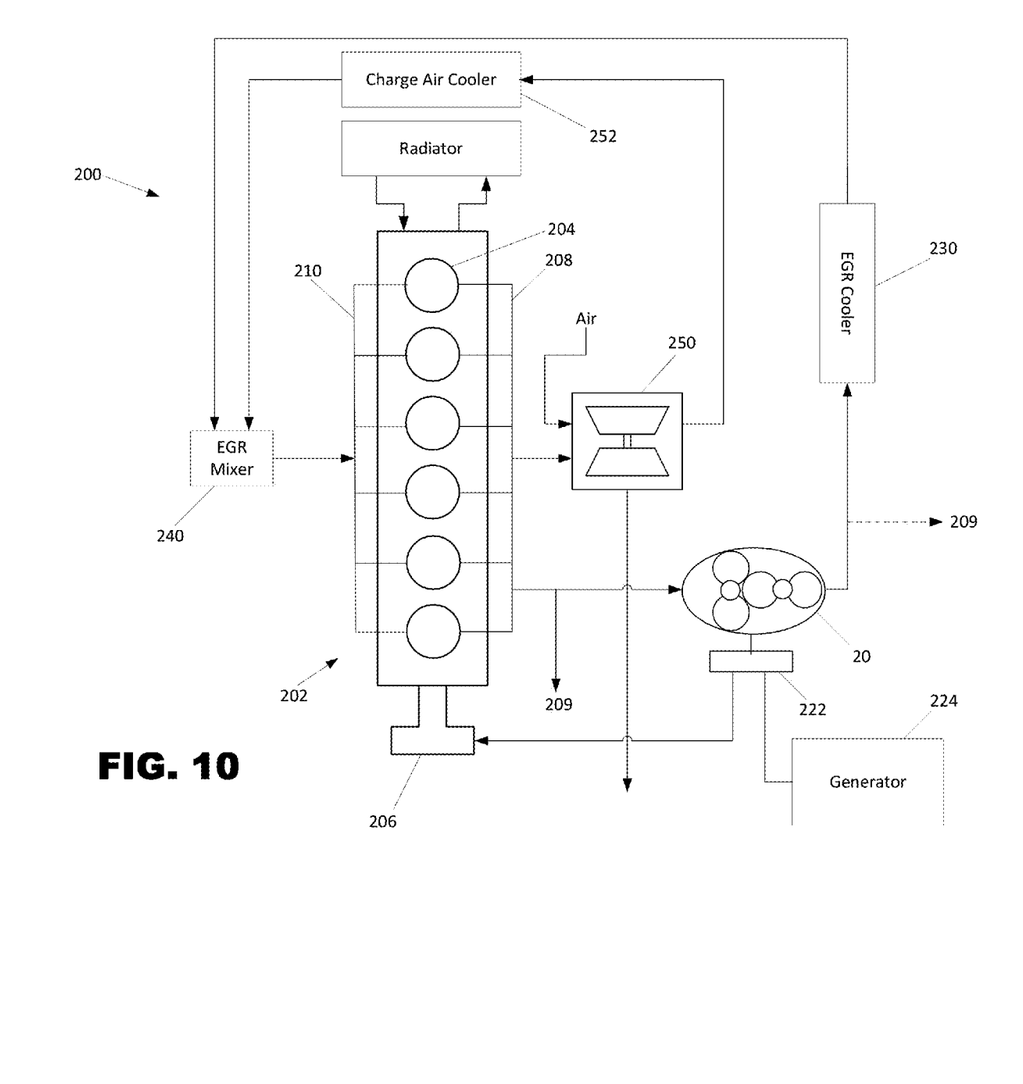
FIG. 10 is a schematic diagram of a third embodiment of the energy recovery system with a turbocharger.

FIG. 10 is a schematic diagram of a third embodiment of the energy recovery system 200. As many of the concepts and features are similar to the second embodiment shown in FIG. 9, the description for the second embodiment is hereby incorporated by reference for the third embodiment. Where like or similar features or elements are shown, the same reference numbers will be used where possible. The following description for the third embodiment will be limited primarily to the differences between the second and third embodiments.

In this embodiment, the system 200 is implemented with a turbocharger 250. As shown in FIG. 10, the turbocharger 250 is in fluid communication with the exhaust manifold 208 and is configured to be driven by the exhaust gases from the exhaust manifold 208. The turbocharger 250 also includes a charge air cooler 252 for cooling down the air supplied to the intake manifold 210 so as to increase engine efficiency. The EGR mixer 240 operates to receive the compressed air from the turbocharger 250, the exhaust gases passing through the volumetric fluid expander 20, and supply the mixture thereof into the intake manifold 210 of the engine 202. Other elements in the system 200 are the same as, or similar to, those as explained with reference to FIG. 9, and, thus, are not explained in further detail for brevity purposes.

Figure 11:
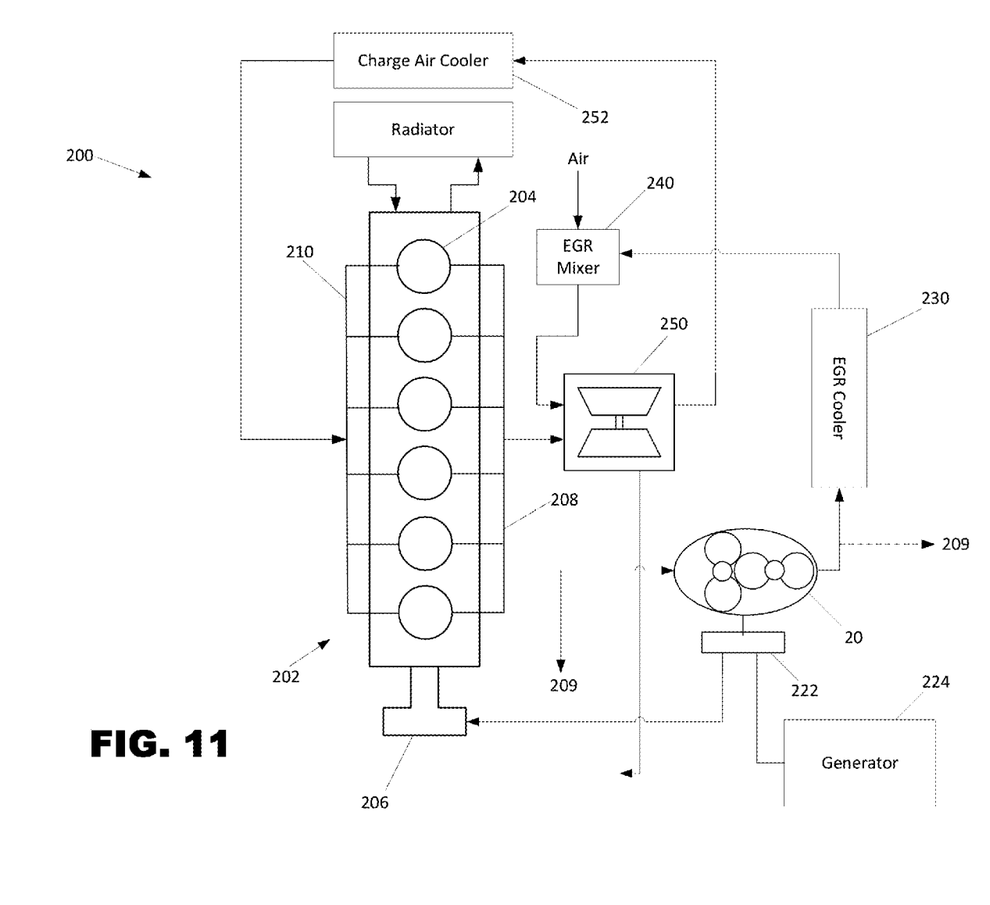
FIG. 11 is a schematic diagram of a fourth embodiment of the energy recovery system with a turbocharger.

FIG. 11 is a schematic diagram of a fourth embodiment of the energy recovery system 200 with the turbocharger 250. The configuration of FIG. 11 is the same as that of FIG. 10, except that the EGR mixer 240 is arranged prior to the turbocharger 250. As many of the concepts and features are similar to the third embodiment shown in FIG. 10, the description for the third embodiment is hereby incorporated by reference for the fourth embodiment. Where like or similar features or elements are shown, the same reference numbers will be used where possible. The following description for the fourth embodiment will be limited primarily to the differences between the third and fourth embodiments.

In this embodiment, the EGR mixer 240 receives air as well as the exhaust gases from the volumetric fluid expander 20 and supplies the mixture of the air and the exhaust gases into the turbocharger 250. Other elements are not explained in further detail for brevity purposes.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:
1. An exhaust gas energy recovery system comprising:
an engine having an intake manifold and an exhaust manifold; and
a volumetric fluid expander receiving a first exhaust stream, expanding the first exhaust stream to a second exhaust stream, generating a mechanical work, and discharging the second exhaust stream, the second exhaust stream having a lower pressure than the first exhaust stream,
wherein the volumetric fluid expander includes a housing having an inlet port and an outlet port, the inlet port in fluid communication with the exhaust manifold and configured to receive the first exhaust stream from the exhaust manifold, and the outlet port in fluid communication with the intake manifold and configured to discharge the second exhaust stream, wherein the volumetric fluid expander further comprising: a plurality of meshed rotors disposed in the housing and configured to expand the first exhaust stream into the second exhaust stream; and an output shaft operatively connected to one of the plurality of rotors and rotated by the exhaust as the exhaust undergoes expansion through the plurality of rotors within the housing.

2. The system of claim 1, wherein the inlet port is directly in fluid communication with the exhaust manifold, and the outlet port is directly in fluid communication with the intake manifold.

3. The system of claim 1, wherein the plurality of rotors includes first and second twisted meshed rotors rotatably disposed in the housing, wherein each rotor has a plurality of non-contacting lobes of an equal number.

4. The system of claim 1, further comprising a generator configured to control the volumetric fluid expander to adjust an amount of the second exhaust stream discharged from the volumetric fluid expander.

5. The system of claim 1, further comprising a generator configured to control a rotational speed of the rotors to adjust an amount of the second exhaust stream discharged from the volumetric fluid expander.

6. The system of claim 1, further comprising an energy storage device, wherein a mechanical work generated by the volumetric fluid expander is accumulated in the energy storage device for subsequent release on demand.

7. The system of claim 6, wherein the energy storage device is a battery or an accumulator.

8. A volumetric fluid expander for an engine, the engine having an intake manifold and an exhaust manifold, the expander comprising:
  a housing having an inlet port and an outlet port, the inlet port in fluid communication with the exhaust manifold and configured to receive a first exhaust stream from the exhaust manifold, and the outlet port in fluid communication with the intake manifold and configured to discharge a second exhaust stream, the second exhaust stream having a lower pressure or temperature than the first exhaust stream;
  a plurality of meshed rotors disposed in the housing and configured to expand the first exhaust stream into the second exhaust stream; and
  an output shaft operatively connected to one of the plurality of rotors and rotated by the exhaust to generate a mechanical work as the exhaust undergoes expansion through the plurality of rotors within the housing.

9. The expander of claim 8, wherein the plurality of rotors includes first and second twisted meshed rotors rotatably disposed in the housing, wherein each rotor has a plurality of non-contacting lobes of an equal number.

10. The expander of claim 8, wherein the inlet port is directly in fluid communication with the exhaust manifold, and the outlet port is directly in fluid communication with the intake manifold.

11. The expander of claim 8, further comprising a generator configured to control the volumetric fluid expander to adjust a volume of the second exhaust stream discharged from the volumetric fluid expander.

12. The expander of claim 11, wherein the generator is configured to control a rotational speed of the rotors.

13. The expander of claim 8, further comprising an energy storage device, wherein a mechanical work generated by the volumetric fluid expander is accumulated in the energy storage device for subsequent release on demand.

14. The expander of claim 13, wherein the energy storage device is a battery or an accumulator.

15. A generator for a volumetric fluid expander, the volumetric fluid expander comprising:
  a housing having an inlet port and an outlet port, the inlet port in fluid communication with an exhaust manifold of an internal combustion engine and configured to receive a first exhaust stream from the exhaust manifold, and the outlet port in fluid communication with an intake manifold of the engine and configured to discharge a second exhaust stream, the second exhaust stream having a lower pressure or temperature than the first exhaust stream;
  a plurality of meshed rotors disposed in the housing and configured to expand the first exhaust stream into the second exhaust stream; and
  an output shaft operatively connected to one of the plurality of rotors and rotated by the exhaust to generate a mechanical work as the exhaust undergoes expansion through the plurality of rotors within the housing,
  wherein the generator is configured to control a rotational speed of the rotors to adjust an amount of the second exhaust stream discharged from the housing of the volumetric fluid expander.

16. An exhaust gas energy recovery system comprising:
  a. a power plant having an exhaust gas outlet for conveying an exhaust gas stream at a first pressure; and
  b. a volumetric fluid expander including:
    i. a housing having an inlet and an outlet, the housing inlet being in fluid communication with the exhaust gas outlet;
    ii. an output shaft;
  c. wherein the volumetric fluid expander is configured to generate useful work at the output shaft by expanding the exhaust gas stream to a second pressure lower than the first pressure generally without reducing the volume of the exhaust stream as the exhaust stream moves from the housing inlet to the outlet, wherein the volumetric fluid expander includes: a. first and second twisted meshed rotors rotatably disposed in the housing, wherein the rotors have an equal number of lobes, and wherein the lobes of the first rotor do not contact the lobes of the second rotor.

17. The exhaust gas energy recovery system of claim 16, wherein the power plant is a fuel cell.

18. The exhaust gas energy recovery system of claim 16, wherein the power plant is a combustion engine of a vehicle.

19. The exhaust gas energy recovery system of claim 16, wherein the volumetric fluid expander output shaft is mechanically coupled to an output shaft of the power plant.

20. The exhaust gas energy recovery system of claim 16, wherein the volumetric fluid expander output shaft is mechanically coupled to a generator.

21. The exhaust gas energy recovery system of claim 19, wherein the volumetric fluid expander output shaft is additionally coupled to a generator or a hydraulic pump.

22. The exhaust gas energy recovery system of claim 21, wherein a variable speed drive system connects the expander output shaft to the output shaft of the power plant and to the generator or hydraulic pump.

23. The exhaust gas energy recovery system of claim 22, wherein the variable speed drive system is a planetary gear set having a sun gear, a ring gear, and a plurality of planet gears between the sun and the ring gears.

24. The exhaust gas energy recovery system of claim 23, wherein the sun gear is coupled to the volumetric fluid expander output shaft, the planet gears are coupled to the power plant output shaft, and the ring gear is coupled to the generator or hydraulic pump.

\* \* \* \* \*